United States Patent
Mamiya et al.

(10) Patent No.: US 7,741,399 B2
(45) Date of Patent: Jun. 22, 2010

(54) RUBBER COMPOSITION AND TIRE USING THE SAME

(75) Inventors: Motoyuki Mamiya, Higashiyamato (JP); Hajime Kondo, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 62 days.

(21) Appl. No.: 12/094,659

(22) PCT Filed: Dec. 6, 2006

(86) PCT No.: PCT/JP2006/624365

§ 371 (c)(1),
(2), (4) Date: Jun. 4, 2008

(87) PCT Pub. No.: WO2007/066689

PCT Pub. Date: Jun. 14, 2007

(65) Prior Publication Data

US 2008/0269380 A1    Oct. 30, 2008

(30) Foreign Application Priority Data

Dec. 7, 2005   (JP)   .............................. 2005-353301

(51) Int. Cl.
   C08K 3/04   (2006.01)
(52) U.S. Cl. ...................... 524/495; 524/496
(58) Field of Classification Search ............ 524/495, 524/496
   See application file for complete search history.

(56) References Cited

U.S. PATENT DOCUMENTS

2007/0010610 A1* 1/2007 Kondo ........................ 524/493

FOREIGN PATENT DOCUMENTS

| JP | 8-53502 A | 2/1996 |
|---|---|---|
| JP | 2000-109612 A | 4/2000 |
| JP | 2004-359716 A | 12/2004 |
| JP | 2006-143881 A | 6/2006 |
| JP | 2006-151163 A | 6/2006 |
| JP | 2006-151259 A | 6/2006 |
| JP | 2006-151261 A | 6/2006 |
| JP | 2006-152156 A | 6/2006 |
| JP | 2006-152211 A | 6/2006 |
| JP | 2006-183036 A | 7/2006 |
| JP | 2006-219618 A | 8/2006 |

* cited by examiner

*Primary Examiner*—Peter Szekely
(74) *Attorney, Agent, or Firm*—Sughrue Mion, PLLC

(57) ABSTRACT

Disclosed is a rubber composition having excellent low loss characteristics and capable of imparting a tire with wear resistance and fracture resistance. The rubber composition is obtained by blending a carbon black, which has a toluene coloring transmittance of not less than 90% while satisfying the following relation between the hydrogen emission rate (mass %) and the cetyltrimethylammonium bromide adsorption specific surface area (CTAB) ($m^2/g$): the hydrogen emission rate $>0.260-6.25\times10^{-4}\times CTAB$, into a modified natural rubber which is obtained by adding a polar group-containing monomer into a natural rubber latex for graft-polymerizing the polar group-containing monomer to a natural rubber molecule in the natural rubber latex, and then solidifying and drying the resulting product.

6 Claims, No Drawings

RUBBER COMPOSITION AND TIRE USING THE SAME

TECHNICAL FIELD

This invention relates to a rubber composition and a tire using the rubber composition, and more particularly to a rubber composition capable of imparting sufficient wear resistance and fracture resistance to a tire in addition to a low loss factor when being used in a tread of the tire.

BACKGROUND ART

Lately, it is strongly demanded to reduce a fuel consumption of an automobile and hence a tire having a lower rolling resistance is required. For this end, there is required a rubber composition being excellent in the low loss factor (low heat buildup) as a rubber composition used in a tread or the like of the tire. Also, the rubber composition for the tread is required to be excellent in the wear resistance and fracture characteristics in addition to the low loss factor. As to these requirements, in order to improve the low loss factor, wear resistance and fracture characteristics of a rubber composition formed by compounding a filler such as carbon black or the like into a rubber component, it is effective to improve an affinity between the filler and the rubber component in such a rubber composition.

For example, in order to improve the reinforcing effect with the filler by improving the affinity between the filler and the rubber component in the rubber composition, there are developed a synthetic rubber wherein the affinity for the filler is improved by a terminal modification, a synthetic rubber wherein the affinity for the filler is improved by copolymerizing with a functional group-containing monomer and so on.

On the other hand, a natural rubber is voluminously used while utilizing its excellent physical characteristics, but there is no technique wherein the affinity for the filler is improved by modifying the natural rubber itself to highly improve the reinforcing effect with the filler.

For example, there is proposed a technique for epoxidizing the natural rubber, but the affinity between the natural rubber and the filler cannot be sufficiently improved in this technique, so that the reinforcing effect with the filler cannot be sufficiently improved (for example, see JP-A-H06-329702). Also, there is known a technique wherein a graft-polymerization is conducted by adding a vinyl-based monomer to a natural rubber latex, and the grafted natural rubber obtained by this technique is put into a practical use as an adhesive or the like (for example, JP-A-H09-25468 and JP-A-2002-138266). In the grafted natural rubber, however, a large amount of the vinyl compound as a monomer (20-50% by mass) is grafted for changing the characteristics of the natural rubber itself, so that when it is compounded with carbon black, the viscosity is largely increased and the processability is deteriorated. Moreover, since the large amount of the vinyl compound is introduced into the molecular chain of the natural rubber, there are damaged the excellent physical characteristics inherent to natural rubber (viscoelasticity, stress-strain curve in a tensile test and the like).

Moreover, JP-A-2004-359713 discloses that a rubber composition having improved wear resistance and low heat buildup is obtained with a modified natural rubber formed by graft-polymerizing a polar group-containing monomer onto a natural rubber molecule in a natural rubber latex.

DISCLOSURE OF THE INVENTION

However, there is still a room for improving the low loss factor and wear resistance of the rubber composition even if the technique disclosed in JP-A-2004-359713 is applied.

It is, therefore, an object of the invention to solve the above-mentioned problems of the conventional techniques and to provide a rubber composition capable of imparting sufficient wear resistance and fracture resistance to a tire in addition to a low loss factor as well as a tire using the rubber composition.

The inventors have made various studies in order to achieve the above object and discovered that a tire having excellent low loss factor, wear resistance and fracture resistance is obtained by applying a rubber composition compounded with carbon black having a high reactivity to a specific modified natural rubber to a tire, particularly a tread of the tire, and as a result the invention has been accomplished.

That is, the rubber composition according to the invention is characterized by compounding carbon black having a toluene coloring transmittance of not less than 90% and satisfying a relationship between hydrogen emission ratio (% by mass) and cetyltrimethylammonium bromide adsorption specific surface area (CTAB) (m$^2$/g) represented by the following equation (I):

$$\text{Hydrogen emission ratio} > 0.260 - 6.25 \times 10^{-4} \times CTAB \quad (I)$$

into a modified natural rubber formed by adding a polar group-containing monomer to a natural rubber latex to graft-polymerize the polar group-containing monomer onto a natural rubber molecule in the natural rubber latex and then coagulating and drying.

In a preferable embodiment of the rubber composition according to the invention, the polar group of the polar group-containing monomer is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and alkoxysilyl group.

In another preferable embodiment of the rubber composition according to the invention, a grafting amount of the polar group-containing monomer is 0.01-5.0% by mass based on a rubber component in the natural rubber latex.

In the other preferable embodiment of the rubber composition according to the invention, a surfactant is added to the natural rubber latex.

Also, the tire according to the invention is characterized by using the above-described rubber composition in any tire member. At this moment, the tire member is preferably a tread.

According to the invention, there can be provided a rubber composition capable of imparting excellent wear resistance and fracture resistance to a tire in addition to a low loss factor by compounding carbon black having a high reactivity to a specific modified natural rubber.

BEST MODE FOR CARRYING OUT THE INVENTION

The invention will be described in detail below. The rubber composition according to the invention is characterized by compounding carbon black having a toluene coloring transmittance of not less than 90% and satisfying a relationship between a hydrogen emission ratio (% by mass) and a cetyltrimethylammonium bromide adsorption specific surface area (CTAB) ($m^2/g$) of the aforementioned equation (I) into a modified natural rubber formed by adding a polar group-containing monomer to a natural rubber latex to graft-polymerize the polar group-containing monomer onto a natural rubber molecule in the natural rubber latex and then coagulating and drying. The modified natural rubber obtained by introducing the polar group-containing monomer into the natural rubber molecule through graft-polymerization is high in the affinity for carbon black as compared with an unmodified natural rubber. Furthermore, the carbon black satisfying the equation (I) is high in the reactivity to the rubber component as compared with a conventional carbon black. In the rubber composition according to the invention using the modified natural rubber and the carbon black, therefore, the reactivity of the carbon black to the rubber component is very high, so that the reinforcing effect of the carbon black is sufficiently developed to make the fracture resistance and the wear resistance excellent and highly improve the low loss factor.

The natural rubber latex used in the production of the above modified natural rubber is not particularly limited and can include, for example, a field latex, an ammonia-treated latex, a centrifugally concentrated latex, a deproteinized latex treated with a surfactant or an enzyme, a combination thereof and so on.

The polar group-containing monomer added to the natural rubber latex is not particularly limited as long as it has at least one polar group in its molecule and can be graft-polymerized with the natural rubber molecule. At this moment, the polar group-containing monomer is preferable to have a carbon-carbon double bond in its molecule for the graft-polymerization with the natural rubber molecule and is preferably a polar group-containing vinyl-based monomer. As a concrete example of the polar group may be preferably mentioned amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group, alkoxysilyl group and so on. These polar group-containing monomers may be used alone or in a combination of two or more.

As the amino group-containing monomer are mentioned polymerizable monomers containing in their molecule at least one amino group selected from primary, secondary and tertiary amino groups. Among the amino group-containing polymerizable monomers, a tertiary amino group-containing monomer such as dialkylaminoalkyl (metha)acrylate or the like is particularly preferable. These amino group-containing monomers may be used alone or in a combination of two or more.

As the primary amino group-containing monomer are mentioned acrylamide, methacrylamide, 4-vinylaniline, aminomethyl (metha)acrylate, aminoethyl (metha)acrylate, aminopropyl (metha)acrylate, aminobutyl (metha)acrylate and so on.

As the secondary amino group-containing monomer are mentioned (1) anilinostyrenes such as anilinostyrene, β-phenyl-p-anilinostyrene, β-cyano-p-anilinostyrene, β-cyano-β-methyl-p-anilinostyrene, β-chloro-p-anilinostyrene, β-carboxy-p-anilinostyrene, β-methoxycarbonyl-p-anilinostyrene, β-(2-hydroxyethoxy)carbonyl-p-anilinostyrene, β-formyl-p-anilinostyrene, β-formyl-β-methyl-p-anilinostyrene, α-carboxy-β-carboxy-β-phenyl-p-anilinostyrene and the like, (2) anilinophenyl butadienes such as 1-anilinophenyl-1,3-butadiene, 1-anilinophenyl-3-methyl-1,3-butadiene, 1-anilinophenyl-3-chloro-1,3-butadiene, 3-anilinophenyl-2-methyl-1,3-butadiene, 1-anilinophenyl-2-chloro-1,3-butadiene, 2-anilinophenyl-1,3-butadiene, 2-anilinophenyl-3-methyl-1,3-butadiene, 2-anilinophenyl-3-chloro-1,3-butadiene and the like, and (3) N-monosubstituted (metha)acrylamides such as N-methyl (metha)acrylamide, N-ethyl (metha)acrylamide, N-methylol acrylamide, N-(4-aminophenyl)methacrylamide and the like.

As the tertiary amino group-containing monomer are mentioned N,N-disubstituted aminoalkyl (metha)acrylate, N,N-disubstituted aminoalkyl (metha)acrylamide and the like.

As the N,N-disubstituted aminoalkyl (metha)acrylate are mentioned esters of acrylic acid or methacrylic acid such as N,N-dimethylaminomethyl (metha)acrylate, N,N-dimethylaminoethyl (metha)acrylate, N,N-diethylaminopropyl (metha)acrylate, N,N-dimethylaminobutyl (metha)acrylate, N,N-diethylaminoethyl (metha)acrylate, N,N-diethylaminopropyl (metha)acrylate, N,N-diethylaminobutyl (metha) acrylate, N-methyl-N-ethylaminoethyl (metha)acrylate, N,N-dipropylaminomethyl (metha)acrylate, N,N-dibutylaminoethyl (metha)acrylate, N,N-dibutylaminopropyl (metha)acrylate, N,N-dibutylaminobutyl (metha)acrylate, N,N-dihexylaminoethyl (metha)acrylate, N,N-dioctylaminoethyl (metha)acrylate, acryloyl morpholine and so on. Among them, N,N-dimethylaminoethyl (metha)acrylate, N,N-diethylaminoethyl (metha)acrylate, N,N-dipropylaminomethyl (metha)acrylate, N,N-dioctylaminoethyl (metha)acrylate, N-methyl-N-ethylaminoethyl (metha)acrylate and the like are particularly preferable.

Also, as the N,N-disubstituted aminoalkyl (metha)acrylamide are mentioned acrylamide compounds or methacrylamide compounds such as N,N-dimethylaminomethyl (metha)acrylamide, N,N-dimethylaminoethyl (metha)acrylamide, N,N-diethylaminopropyl (metha)acrylamide, N,N-dimethylaminobutyl (metha)acrylamide, N,N-diethylaminoethyl (metha)acrylamide, N,N-diethylaminopropyl (metha)acrylamide, N,N-diethylaminobutyl (metha)acrylamide, N-methyl-N-ethylaminoethyl (metha)acrylamide, N,N-dipropylaminomethyl (metha)acrylamide, N,N-dibutylaminoethyl (metha)acrylamide, N,N-dibutylaminopropyl (metha)acrylamide, N,N-dibutylaminobutyl (metha)acrylamide, N,N-dihexylaminoethyl (metha)acrylamide, N,N-dihexylaminopropyl (metha)acrylamide, N,N-dioctylaminopropyl (metha)acrylamide and so on. Among them, N,N-diethylaminopropyl (metha)acrylamide, N,N-diethylaminopropyl (metha)acrylamide, N,N-dioctylaminopropyl (metha)acrylamide and the like are particularly preferable.

As the nitrile group-containing monomer are mentioned (metha)acrylonitrile, vinylidene cyanide and so on. These nitrile group-containing monomers may be used alone or in a combination of two or more.

As the hydroxyl group-containing monomer are mentioned polymerizable monomers having in their molecule at least one hydroxyl group selected from primary, secondary and tertiary hydroxyl groups. As such a monomer are mentioned hydroxyl group-containing unsaturated carboxylic acid monomers, hydroxyl group-containing vinyl ether monomers, hydroxyl group-containing vinyl ketone monomers and the like. As the hydroxyl group-containing monomer are concretely mentioned hydroxyalkyl (metha)acrylates such as 2-hydroxyethyl (metha)acrylate, 2-hydroxypropyl (metha) acrylate, 3-hydroxypropyl (metha)acrylate, 2-hydroxybutyl (metha)acrylate, 3-hydroxybutyl (metha)acrylate, 4-hydroxybutyl (metha)acrylate and the like; mono (metha)acrylates of polyalkylene glycol (the number of alkylene glycol units is, for example, 2-23) such as polyethylene glycol, polypropylene glycol and the like; hydroxyl group-containing unsaturated amides such as N-hydroxymethyl (metha) acrylamide, N-(2-hydroxyethyl)(metha)acrylamide, N,N-bis (2-hydroxyethyl)(metha)acrylamide and the like; hydroxyl group-containing vinylaromatic compounds such as o-hydroxystyrene, m-hydroxystyrene, p-hydroxystyrene, o-hydroxy-α-methylstyrene, m-hydroxy-α-methylstyrene, p-hydroxy-α-methylstyrene, p-vinylbenzyl alcohol and the like. Among them, the hydroxyl group-containing unsaturated carboxylic acid-based monomers, hydroxyalkyl (metha) acrylates and hydroxyl group-containing vinylaromatic compounds are preferable, and the hydroxyl group-containing unsaturated carboxylic acid-based monomers are particularly preferable. As the hydroxyl group-containing unsaturated carboxylic acid-based monomer are mentioned derivatives such as esters, amides, anhydrides and the like of acrylic acid, methacrylic acid, itaconic acid, fumaric acid, maleic acid and the like. Among them, esters of acrylic acid, methacrylic acid and the like are particularly preferable. These hydroxyl group-containing monomers may be used alone or in a combination of two or more.

As the carboxyl group-containing monomer are mentioned unsaturated carboxylic acids such as (metha)acrylic acid, maleic acid, fumaric acid, itaconic acid, tetraconic acid, cinnamic acid and the like; free carboxyl group-containing esters such as monoesters of a non-polymerizable polyvalent carboxylic acid such as phthalic acid, succinic acid, adipic acid or the like and a hydroxyl group-containing unsaturated compound such as (metha)allyl alcohol, 2-hydroxyethyl (metha) acrylate or the like, and salts thereof, and so on. Among them, the unsaturated carboxylic acids are particularly preferable. These carboxyl group-containing monomers may be used alone or in a combination of two or more.

As the epoxy group-containing monomer are mentioned (metha)acllyl glycidyl ether, glycidyl (metha)acrylate, 3,4-oxocyclohexyl (metha)acrylate and so on. These epoxy group-containing monomers may be used alone or in a combination of two or more.

As the nitrogen-containing heterocyclic ring in the monomer containing the nitrogen-containing heterocyclic group are mentioned pyrrole, histidine, imidazole, triazolidine, triazole, triazine, pyridine, pyrimidine, pyrazine, indole, quinoline, purine, phenazine, pteridine, melamine and so on. Moreover, the nitrogen-containing heterocyclic ring may include another heteroatom in its ring. A monomer containing pyridyl group as the nitrogen-containing heterocyclic group includes pyridyl group-containing vinyl compounds such as 2-vinylpyridine, 3-vinylpyridine, 4-vinylpyridine, 5-methyl-2-vinylpyridine, 5-ethyl-2-vinylpyridine and so on. Among them, 2-vinylpyridine, 4-vinylpyridine and the like are particularly preferable. These nitrogen-containing heterocyclic group-containing monomers may be used alone or in a combination of two or more.

As the alkoxysilyl group-containing monomer are mentioned (metha)acryloxymethyl trimethoxysilane, (metha) acryloxymethyl methyl dimethoxysilane, (metha)acryloxymethyl dimethyl methoxysilane, (metha) acryloxymethyl triethoxysilane, (metha)acryloxymethyl methyl diethoxysilane, (metha)acryloxymethyl dimethyl ethoxysilane, (metha)acryloxymethyl tripropoxysilane, (metha)acryloxymethyl methyl dipropoxysilane, (metha) acryloxymethyl dimethyl propoxysilane, γ-(metha)acryloxypropyl trimethoxysilane, γ-(metha)acryloxypropyl methyl dimethoxysilane, γ-(metha)acryloxypropyl dimethyl methoxysilane, γ-(metha)acryloxypropyl triethoxysilane, γ-(metha)acryloxypropyl methyl diethoxysilane, γ-(metha) acryloxypropyl dimethyl ethoxysilane, γ-(metha)acryloxypropyl tripropoxysilane, γ-(metha)acryloxypropyl methyl dipropoxysilane, γ-(metha)acryloxypropyl dimethyl propoxysilane, γ-(metha)acryloxypropyl methyl diphenoxysilane, γ-(metha)acryloxypropyl dimethyl phenoxysilane, γ-(metha)acryloxypropyl methyl dibenzyloxysilane, γ-(metha)acryloxypropyl dimethyl benzyloxysilane, trimethoxy vinylsilane, triethoxy vinylsilane, 6-trimethoxysilyl-1,2-hexene, p-trimethoxysilyl styrene and so on. These alkoxysilyl group-containing monomers may be used alone or in a combination of two or more.

In the invention, the graft polymerization of the polar group-containing monomer onto the natural rubber molecule is conducted as an emulsion polymerization. In the emulsion polymerization, it is commonly preferable that the polar group-containing monomer is added to a solution of the natural rubber latex containing water and, if necessary, an emulsifying agent and further added with a polymerization initiator, which are stirred at a given temperature to polymerize the polar group-containing monomer. In the addition of the polar group-containing monomer to the natural rubber latex, the emulsifying agent may be previously added to the natural rubber latex, or the polar group-containing monomer may be emulsified with the emulsifying agent and then added to the natural rubber latex. The emulsifying agent usable in the emulsification of the natural rubber latex and/or the polar group-containing monomer is not particularly limited and includes nonionic surfactants such as polyoxyethylene lauryl ether and the like.

The polymerization initiator is not particularly limited and may include various polymerization initiators for the emulsion polymerization, and also the addition method thereof is not particularly limited. As the commonly used polymerization initiator are mentioned benzoyl peroxide, hydrogen peroxide, cumene hydroperoxide, tert-butyl hydroperoxide, di-tert-butyl peroxide, 2,2-azobisisobutyronitrile, 2,2-azobis(2-diaminopropane) hydrochloride, 2,2-azobis(2-diaminopropane) dihydrochloride, 2,2-azobis(2,4-dimethylvaleronitrile), potassium persulfate, sodium persulfate, ammonium persulfate and so on. Moreover, it is preferable to use a redox type polymerization initiator for lowering the polymerization temperature. As a reducing agent to be combined with a peroxide in the redox type polymerization initiator are mentioned, for example, tetraethylene pentamine, mercaptanes, acidic sodium sulfite, a reducing metal ion, ascorbic acid and so on. As a preferable combination of the peroxide and the reducing agent in the redox type polymerization initiator are mentioned a combination of tert-butyl hydroperoxide and tetraethylene pentamine and so on.

In order to improve the low loss factor and the wear resistance of the rubber composition formed by compounding the carbon black into the modified natural rubber without deteriorating the processability, it is important to evenly introduce a small amount of the polar group-containing monomer into each of the natural rubber molecules. Therefore, the amount of the polymerization initiator added is preferably within a range of 1-100 mol %, and more preferably 10-100 mol % based on the polar group-containing monomer.

The aforementioned components are charged into a reaction vessel and reacted at 30-80° C. for 10 minutes to 7 hours to obtain a modified natural rubber latex wherein the polar group-containing monomer is graft-copolymerized to the natural rubber molecule. Moreover, the modified natural rubber latex is coagulated and washed and dried by using a drying machine such as a vacuum drier, an air drier, drum drier or the like to obtain a modified natural rubber. A coagulant used in the coagulation of the modified natural rubber latex is not particularly limited and includes acids such as formic acid, sulfuric acid and the like, and salts such as sodium chloride and the like.

In the modified natural rubber latex and the modified natural rubber, the grafting amount of the polar group-containing monomer is preferably within a range of 0.01-5.0% by mass, more preferably 0.01-1.0% by mass based on the rubber component in the natural rubber latex. When the grafting amount of the polar group-containing monomer is less than 0.01% by mass, the low loss factor and the wear resistance of the rubber composition may not be sufficiently improved. While, when the grafting amount of the polar group-containing monomer exceeds 5.0% by mass, the physical properties inherent to the natural rubber such as viscoelasticity, S-S characteristic (stress-strain curve in the tensile testing machine) and so on are largely changed to diminish the excellent physical properties inherent to the natural rubber and also the processability of the rubber composition may be largely deteriorated.

The carbon black used in the rubber composition according to the invention has a toluene coloring transmittance of not less than 90% and satisfies a relationship between hydrogen emission ratio (% by mass) and cetyltrimethylammonium bromide adsorption specific surface area (CTAB) ($m^2/g$) represented by the following equation (I):

$$\text{Hydrogen emission ratio} > 0.260 - 6.25 \times 10^{-4} \times CTAB \quad (I)$$

As shown in the equation (I), the reinforcing property can be improved by increasing the hydrogen emission ratio. Although the dispersibility of carbon black is generally improved with the lowering of CTAB, the particle size of the carbon black becomes large to reduce the contact area between carbon black and the rubber component, and hence the reactivity of the carbon black with the rubber component is deteriorated. The hydrogen emission ratio (% by mass) used herein means a mass percentage of an amount of hydrogen gas generated when carbon black is heated at 2000° C. for 15 minutes wherein the larger the value, the larger the amount of active hydrogen capable of forming a reaction point for the rubber component. The carbon black satisfying the equation (I) as a relationship between hydrogen emission ratio and CTAB is high in the effect for improving the reinforcing property because of many reaction points for the rubber component. Therefore, the reaction point between the carbon black and the modified natural rubber is increased by compounding the above carbon black into the modified natural rubber, and hence the bonding point between the carbon black and the modified natural rubber is increased to provide the rubber composition having excellent reinforcing property, low loss factor and wear resistance.

At this moment, the hydrogen emission ratio (% by mass) is indicated as a mass percentage by measuring the amount of hydrogen gas generated when (1) a carbon black sample is dried in a constant temperature drier at 105° C. for 1 hour and cooled to room temperature in a desiccator and (2) about 10 mg of the carbon black sample is precisely weighed in a tubular sample vessel made of tin and then the vessel is press-bonded and tightly sealed and (3) the sample is heated at 2000° C. under an argon flow for 15 minutes by using a hydrogen analyzer [EMGA621W manufactured by HORIBA, Ltd.].

Also, when the toluene coloring transmittance is low, a tar content to be an inhibition factor of the reinforcing property is increased to cause the deterioration of the reinforcing property. Specifically, when the toluene coloring transmittance is less than 90%, it is difficult to maintain the reinforcing property because a large amount of the tar content as the inhibition factor of the reinforcing property is existent.

The aforementioned carbon black can be produced by adjusting, for example, an air-introducing condition and a raw oil-introducing condition in a carbon black producing furnace, an introducing position and an introducing amount of water introduced for the reaction termination, the subsequent temperature and so on.

The compounding amount of the carbon black is not particularly limited and is preferably within a range of 30-150 parts by mass based on 100 parts by mass of the modified natural rubber. When the compounding amount of the carbon black is less than 30 parts by mass, the sufficient reinforcing property of the rubber composition can not be obtained, while when it exceeds 150 parts by mass, the dispersibility of the carbon black is lowered to deteriorate the wear resistance of the rubber composition.

The rubber composition according to the invention can be properly compounded with additives usually used in the rubber industry such as, for example, other reinforcing filler, a softening agent, an antioxidant, a vulcanizing agent, a vulcanization accelerator, a scorch retarder, zinc white, stearic acid, a silane coupling agent and the like for any purpose in addition to the above modified natural rubber and the carbon black. As these additives may be preferably used commercially available ones. The rubber composition according to the invention can be produced by compounding the modified natural rubber with the carbon black and, if necessary, various additives properly selected and then milling, warming, extruding and so on.

The tire according to the invention is characterized by using the above rubber composition in any tire member. In the tire according to the invention, it is particularly preferable to use the rubber composition as a tread rubber. The tire using the rubber composition in the tread is high in the fracture characteristics and the wear resistance. Moreover, as a gas filled into the tire according to the invention can be used usual air or air having a regulated partial oxygen pressure but also inert gases such as nitrogen and so on.

The following examples are given in illustration of the invention and are not intended as limitations thereof.

EXAMPLE

Production Example of Modified Natural Rubber (Modifying Step of Natural Rubber Latex)

A field latex is subjected to a centrifugal separation with a latex separator [made by Saito Enshin Kogyo Co., Ltd.] at a revolution speed of 7500 rpm to obtain a concentrated latex having a dry rubber concentration of 60%. 1000 g of the concentrated latex is charged into a stainless reaction vessel provided with a stirrer and a temperature-regulating jacket, and an emulsion previously formed by adding 10 mL of water and 90 mg of an emulsifying agent [Emulgen 1108, made by Kao Corporation] to 3.0 g of N,N-diethylaminoethyl methacrylate is added together with 990 mL of water, and then stirred at room temperature for 30 minutes while substituting with nitrogen. Then, 1.2 g of tert-butyl hydroperoxide and 1.2 g of tetraethylene pentamine are added as a polymerization initiator to conduct reaction at 40° C. for 30 minutes, whereby a modified natural rubber latex is obtained.

(Coagulating and Drying Steps)

The modified natural rubber latex is coagulated by adding formic acid to the latex so as to adjust pH to 4.7. The thus obtained solid is treated with a clapper 5 times, crumbed through a shredder and dried by a hot air drier at 110° C. for 210 minutes to obtain a modified natural rubber. It is confirmed from a mass of the thus obtained modified natural rubber that the conversion of N,N-diethylaminoethyl methacrylate added as a monomer is 100%. Also, the separation of a homopolymer is tried by extracting the modified natural rubber with a petroleum ether and further extracting with a 2:1 mixed solvent of acetone and methanol, but the homopolymer is not detected from the analysis of the extract, so that it is confirmed that 100% of the monomer added is introduced into the natural rubber molecule. Therefore, the grafting amount of the monomer in the resulting modified natural rubber is 0.5% by mass based on the rubber component in the natural rubber latex.

Production Example of Natural Rubber

A natural rubber is prepared by directly coagulating and drying the above natural rubber latex without modification.

Production Example of Carbon Black

Carbon blacks are produced according to the conditions shown in Table 1, respectively. With respect to the physical properties of the carbon black, the hydrogen emission ratio is measured by above-mentioned method and the toluene coloring transmittance and the cetyltrimethylammonium bromide adsorption specific surface area are measured by the following methods.

erator DZ [N,N'-dicyclohexyl-2-benzothiazolylsulfenamide] and 1 part by mass of sulfur based on 100 parts by mass of the modified natural rubber.

Comparative Examples 1-6 of Rubber Composition

For the comparison, a rubber composition is prepared according the same compounding recipe as in Example except that a natural rubber is used instead of the modified natural rubber and the carbon black based on the production example shown in Table 2 or 3 is used (Comparative Examples 1, 3, 4 and 6). Also, a rubber composition is prepared according to the same compounding recipe as in Example except that carbon black based on the production example shown in Table 2 or 3 is used (Comparative Examples 2 and 5).

With respect to vulcanized rubbers obtained by vulcanizing the rubber compositions obtained in Examples 1-2 and Comparative Examples 1-6, respectively, under usual conditions, the tan δ and the wear resistance are measured and evaluated by the following methods. The results are shown in Table 2 or 3.

TABLE 1

|  |  | Production Example | | | |
|---|---|---|---|---|---|
|  |  | 1 | 2 | 3 | 4 |
| Production conditions of carbon black | Air amount for production [kg/h] | 1150 | 1150 | 1210 | 1230 |
|  | Fuel-introducing amount [kg/h] | 57 | 59 | 60 | 62 |
|  | Raw material-introducing amount [kg/h] | 280 | 273 | 240 | 256 |
|  | Cooling water amount [l/h] | 250 | 200 | 210 | 190 |
| Physical properties of carbon black | Hydrogen emission ratio [% by mass] | 0.31 | 0.18 | 0.3 | 0.17 |
|  | CTAB [$m^2$/g] | 120 | 120 | 140 | 140 |
|  | Toluene coloring transmittance [%] | 91 | 99 | 92 | 99 |

(1) Cetyltrimethylammonium Bromide Adsorption Specific Surface Area

The specific surface area per unit mass of carbon black ($m^2$/g) is measured according to ASTM D3765-92.

(2) Toluene Coloring Transmittance

The percentage of transmittance for the filtrate of the mixture of carbon black and toluene is measured according to method B of the eighth paragraph in JIS K6218 (1997), and indicated by percentage to a pure toluene.

Examples 1-2 of Rubber Composition

A rubber composition is prepared by compounding and milling 50 parts by mass of carbon black based on the production example shown in Table 2 or 3, 2 parts by mass of stearic acid, 1 part by mass of an antioxidant 6C [N-(1,3-dimethylbutyl)-N'-phenyl-p-phenylenediamine], 3 parts by mass of zinc white, 0.8 part by mass of a vulcanization accel- (1) Tan δ

Tan δ is measured at a temperature of 50° C., a frequency of 15 Hz and a strain of 5% by using a viscoelasticity measuring device manufactured by RHEOMETRICS Corporation, and represented by an index on the basis that tan δ of Comparative Example 3 in Table 2 is 100. The smaller the index value, the better the low loss factor.

(2) Wear Resistance

The wear resistance is evaluated by measuring a worn amount at a slip ratio of 60% and room temperature by means of a Lambourn abrasion tester, and represented by an index on the basis that an inverse number of the worn amount of Comparative Example 3 in Table 2 is 100. The larger the index value, the less the worn amount and the better the wear resistance.

TABLE 2

|  |  | Example 1 | Comparative Example 1 | Comparative Example 2 | Comparative Example 3 |
|---|---|---|---|---|---|
| Natural rubber |  | Modified | Unmodified | Modified | Unmodified |
| Production example of carbon black |  | 1 | 1 | 2 | 2 |
| Physical properties of carbon black | Toluene coloring transmittance [%] | 91 | 91 | 99 | 99 |
|  | Hydrogen emission ratio [% by mass] | 0.31 | 0.31 | 0.18 | 0.18 |
|  | CTAB [$m^2$/g] | 120 | 120 | 120 | 120 |
|  | $0.260 - 6.25 \times 10^{-4} \times$ CTAB | 0.185 | 0.185 | 0.185 | 0.185 |
| Tan δ (index) |  | 61 | 95 | 71 | 100 |
| Wear resistance (index) |  | 115 | 101 | 109 | 100 |

TABLE 3

|  |  | Example 2 | Comparative Example 4 | Comparative Example 5 | Comparative Example 6 |
|---|---|---|---|---|---|
| Natural rubber | | Modified | Unmodified | Modified | Unmodified |
| Production example of carbon black | | 3 | 3 | 4 | 4 |
| Physical properties of carbon black | Toluene coloring transmittance [%] | 92 | 92 | 99 | 99 |
| | Hydrogen emission ratio [% by mass] | 0.3 | 0.3 | 0.17 | 0.17 |
| | CTAB [m$^2$/g] | 140 | 140 | 140 | 140 |
| | 0.260 − 6.25 × 10$^{-4}$ × CTAB | 0.173 | 0.173 | 0.173 | 0.173 |
| Tan δ (index) | | 72 | 105 | 82 | 110 |
| Wear resistance (index) | | 125 | 110 | 118 | 111 |

As seen from the comparison of the carbon blacks used in Examples 1-2 and Comparative Examples 1 and 4 and satisfying the relationship of the equation (I) and having an excellent reactivity with the carbon blacks used in Comparative Examples 2, 3, 5 and 6, the low loss factor of the rubber composition is improved.

Also, as seen from the comparison of the rubber composition using the modified natural rubber with the rubber composition using the unmodified natural rubber, the wear resistance is high in case of using the modified natural rubber.

Further, as seen from Tables 2 and 3, the low loss factor and wear resistance of the rubber composition can be highly improved by synergistically using the modified natural rubber modified with the polar group-containing monomer instead of the natural rubber and the carbon black satisfying the relationship of the equation (I).

The invention claimed is:

1. A rubber composition characterized by compounding carbon black having a toluene coloring transmittance of not less than 90% and satisfying a relationship between hydrogen emission ratio (% by mass) and cetyltrimethylammonium bromide adsorption specific surface area (CTAB) (m$^2$/g) represented by the following equation (I):

Hydrogen emission ratio > 0.260 − 6.25 × 10$^{-4}$ × $CTAB$     (I)

into a modified natural rubber formed by adding a polar group-containing monomer to a natural rubber latex to graft-polymerize the polar group-containing monomer onto a natural rubber molecule in the natural rubber latex and then coagulating and drying.

2. A rubber composition according to claim 1, wherein a polar group of the polar group-containing monomer is at least one selected from the group consisting of amino group, imino group, nitrile group, ammonium group, imide group, amide group, hydrazo group, azo group, diazo group, hydroxyl group, carboxyl group, carbonyl group, epoxy group, oxycarbonyl group, sulfide group, disulfide group, sulfonyl group, sulfinyl group, thiocarbonyl group, nitrogen-containing heterocyclic group, oxygen-containing heterocyclic group and alkoxysilyl group.

3. A rubber composition according to claim 1, wherein a grafting amount of the polar group-containing monomer is 0.01-5.0% by mass based on a rubber component in the natural rubber latex.

4. A rubber composition according to claim 1, wherein a surfactant is added to the natural rubber latex.

5. A tire characterized by using a rubber composition as claimed in any one of claims 1-4 in any tire member.

6. A tire according to claim 5, wherein the tire member is a tread.

* * * * *